(12) United States Patent
King et al.

(10) Patent No.: US 8,242,183 B2
(45) Date of Patent: Aug. 14, 2012

(54) BROMINATED POLYMERS AS FR ADDITIVES AND POLYMER SYSTEMS CONTAINING SAME

(75) Inventors: Bruce A. King, Midland, MI (US); Anteneh Z. Worku, Pearland, TX (US); William G. Stobby, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 120 days.

(21) Appl. No.: 12/866,848

(22) PCT Filed: Jan. 30, 2009

(86) PCT No.: PCT/US2009/032668
§ 371 (c)(1),
(2), (4) Date: Aug. 9, 2010

(87) PCT Pub. No.: WO2009/108453
PCT Pub. Date: Sep. 3, 2009

(65) Prior Publication Data
US 2010/0317757 A1     Dec. 16, 2010

Related U.S. Application Data

(60) Provisional application No. 61/031,476, filed on Feb. 26, 2008.

(51) Int. Cl.
*C08J 9/00* (2006.01)
*C08L 33/04* (2006.01)

(52) U.S. Cl. ............ 521/85; 521/98; 521/134; 521/139; 521/146; 525/190; 525/132; 525/185

(58) Field of Classification Search .................... 521/85, 521/98, 134, 139, 146; 525/190, 132, 185
See application file for complete search history.

(56) References Cited

U.S. PATENT DOCUMENTS

| 3,274,133 | A | * | 9/1966 | Ingram | 521/85 |
| 3,840,499 | A | | 10/1974 | Di Giulio | |
| 4,728,463 | A | * | 3/1988 | Sutker et al. | 252/609 |
| 5,484,649 | A | * | 1/1996 | Vonken et al. | 428/220 |
| 5,717,001 | A | * | 2/1998 | Books et al. | 521/91 |

FOREIGN PATENT DOCUMENTS

| JP | 57-38831 A | * | 3/1982 |
| WO | WO2004/058880 | * | 7/2004 |
| WO | 2007/019120 A | | 2/2007 |

* cited by examiner

*Primary Examiner* — Irina S Zemel
(74) *Attorney, Agent, or Firm* — Gary C Cohn PLLC

(57) ABSTRACT

Certain brominated polymers compounds are effective FR additives for combustible organic polymers. These FR additives include: i) a copolymer having styrene and 2,3-dibromopropylmaleimide repeating units; ii) a brominated polyester having aliphatically bound bromine; iii) an allyl ether of a ring-brominated novolac resin; iv) a 3-bromo-2-hydroxypropyl ether of a novolac resin; v) a 2,3-dibromopropyl ether of a cresol novolac resin; and vi) a brominated ROMP polymer or copolymer.

14 Claims, No Drawings

BROMINATED POLYMERS AS FR ADDITIVES AND POLYMER SYSTEMS CONTAINING SAME

This application claims priority from U.S. Provisional Patent Application No. 61/031,476, filed 26 Feb. 2008.

The present invention relates to flame retardant additives for organic polymers, and in particular to brominated polymer flame retardant additives.

Flame suppressant (FR) additives are commonly added to polymer products used in construction and other applications. The presence of the FR additive allows the foam to pass standard fire tests, as are required in various jurisdictions. Various low molecular weight (<~1000 g/mol) brominated compounds are used as FR additives in these foam products. Many of these, such as hexabromocyclododecane, are under regulatory and public pressure that may lead to restrictions on their use, and so there is an incentive to find a replacement for them.

Various brominated materials have been suggested as FR additives. These include, for example, various brominated small molecules as well as certain brominated polymers. Among the brominated polymers that have been suggested are butadiene polymers and copolymers, brominated novolac resin allyl ethers, brominated poly (1,3-cycloalkadiene)s, and brominated poly(4-vinylphenol allyl ether)s. A number of such brominated small molecules and brominated polymers are described in U.S. Published Patent Application No. 2007/019120.

An alternative FR additive for extruded polymer foams should be capable of allowing the foam to pass standard fire tests, when incorporated into the foam at reasonably low levels. Because extruded foams are processed at elevated temperatures, it is important that the FR additive be thermally stable at the temperature conditions used in the extrusion process. For some foams, such as polystyrene and styrene copolymer foams, these temperatures are often 180° C. or higher. Several problems are encountered if the FR additive decomposes during the extrusion process. These include loss of FR agent and therefore loss of FR properties, and the generation of decomposition products (such as HBr) that are often corrosive and therefore potentially dangerous to humans and harmful to operating equipment. The FR agent should not cause a significant loss of desirable physical properties in the polymer. It is preferable that the FR additive has low toxicity and is not highly bioavailable. A preferred type of blowing agent can be produced inexpensively from readily available starting materials.

The present invention is in one aspect a polymer composition comprising a combustible polymer having mixed therein a brominated FR additive selected from one or more of the following:
i) a copolymer having styrene and 2,3-dibromopropylmaleimide repeating units;
ii) a brominated polyester having aliphatically bound bromine;
iii) an allyl ether of a ring-brominated novolac resin;
iv) a 3-bromo-2-hydroxypropyl ether of a novolac resin;
v) a 2,3-dibromopropyl ether of a cresol novolac resin; and
vi) a brominated ROMP polymer or copolymer.

These brominated FR additives are all readily prepared from starting polymers that are readily available and which in most cases are of low or moderate cost. These brominated FR additives are easily prepared from the starting polymers using straightforward chemistry. These FR additives in most cases have good thermal stability, and for that reason usually can be processed in polymer melt processing operations such as extrusion foaming. The FR additives are effective in imparting FR characteristics to combustible polymers, notably styrene polymers and copolymers, at reasonable levels of usage.

Flame retardant additive type i) materials include organic polymers having styrene and 2,3-dibromopropylmaleimide repeating units. Polymers of this type can be represented by the idealized structure:

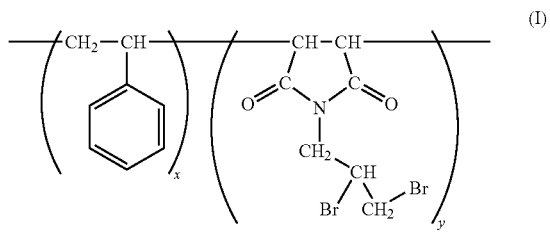

wherein x and y represent the mole fraction of the respective repeating units. In the foregoing structure, some or all of the respective styrene and 2,3-dibromopropylmaleimide repeating units can alternate, and some or all of the respective styrene and 2,3-dibromopropylmaleimide repeating units can form blocks of two or more consecutive units of the same type.

Flame retardant additive type 1) materials are conveniently made from a starting styrene-maleic anhydride copolymer. The mole ratio of styrene to maleic anhydride in the starting copolymer can range from 95:5 to about 40:60, but maleic anhydride levels in the high end of this range (such as from 30 to 60 mole percent maleic anhydride) are preferred as this permits a higher bromine content to be obtained in the final product. Reaction of the starting copolymer with allylamine converts maleic anhydride repeating units to N-allylmaleimide repeating units. The final product is then obtained by brominating the allyl groups.

Flame retardant additive ii) is a brominated polyester having aliphatically bound bromine, i.e., one in which the bromine atoms are bonded directly to aliphatic carbon atoms in the polyester. The aliphatic carbon atoms in this instance may be part of a linear, branched or cyclic structure.

Certain embodiments of flame retardant additive ii) can be prepared by brominating a polyester that contains non-aromatic carbon-carbon unsaturation. A suitable class of starting unsaturated polyesters includes those having an -A-B— structure, in which A represents a dicarboxylic acid repeating unit and B represents a diol repeating unit. Some or all of the A and/or B units contain, prior to bromination, non-aromatic carbon-carbon unsaturation. Polyesters of this type can be prepared in a reaction of a dicarboxylic acid (or corresponding acid halide or anhydride) with a diol, at least one of which contains non-aromatic carbon-carbon unsaturation. Examples of dicarboxylic acids and corresponding anhydrides having non-aromatic carbon-carbon unsaturation include maleic acid, maleic anhydride, fumaric acid, fumaric anhydride, tetrahydrophthalic acid, tetrahydrophthalic anhydride, i.e.,

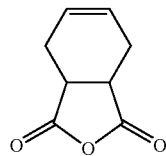

(II)

and the like. Those diacids or anhydrides and/or their respective acid halides can be used to prepare a starting polyester that has A units with non-aromatic carbon-carbon unsaturation. 1,4-Dihydroxy-but-2-ene is an example of a diol having non-aromatic carbon-carbon unsaturation, and can be used to make a starting copolymer having B units that have corresponding unsaturation.

Specific types of unsaturated polyesters that are useful as starting materials to prepare flame retardant additives ii) include, for example:

A. Polyesters of maleic acid or a maleic acid/fumaric acid mixture and one or more aliphatic diols. The aliphatic diol may have non-aromatic carbon-carbon unsaturation, such as 1,4-dihydroxy-but-2-ene, or may be devoid of such unsaturation, such as cyclohexanedimethanol, ethylene glycol, 1,2 propane diol, 1,4-butanediol, 1,6-hexane diol and the like. Mixtures of diols can be used, including a mixture containing at least one diol that contains non-aromatic carbon-carbon unsaturation and at least one diol that does not contain such unsaturation. Specific examples of polyesters of this type include maleic acid/cyclohexanedimethanol polyesters and maleic acid/fumaric acid/cyclohexanedimethanol polyesters.

B. Polyesters of maleic acid or a maleic acid/fumaric acid mixture, at least one additional diacid (or corresponding acid halide or anhydride), and one or more aliphatic diols. The additional diacid may be aromatic or aliphatic and if aliphatic, may or may not contain carbon-carbon unsaturation. Examples of additional diacids include phthalic acid or terephthalic acid. The aliphatic diols may be as described with regard to polyester type A. An example of a polyester of this type is a maleic acid/terephthalic acid/cyclohexanedimethanol polyester or a maleic acid/fumaric acid/terephthalic acid/cyclohexanedimethanol polyester.

C. Polyesters of tetrahydrophthalic anhydride with one or more aliphatic diols. The aliphatic diols may be as described with regard to polyester type A. An example of a polyester of this type is a tetrahydrophthalic anhydride/ethylene glycol polyester.

D. Polyesters of tetrahydrophthalic anhydride at least one additional diacid (or corresponding acid halide or anhydride) and one or more aliphatic diols. The additional diacid may be aromatic or aliphatic and if aliphatic, may or may not contain carbon-carbon unsaturation. Examples of additional diacids include phthalic acid or terephthalic acid. The aliphatic diols may be as described with regard to polyester type A. An example of a polyester of this type is a tetrahydrophthalic anhydride/terephthalic acid/ethylene glycol polyester.

E. Polyesters of 1,4-dihydroxy-but-2-ene with one or more diacids (or corresponding acid halides or anhydrides). The diacid may or may not contain non-aromatic carbon-carbon unsaturation, and mixtures of each type or of both types can be used. Terephthalic acid/1,4-dihydroxy-but-2-ene polyesters are examples of starting polyesters of this type.

F. Polyesters of 1,4-dihydroxy-but-2-ene, at least one additional diol, with one or more diacids (or corresponding acid halides or anhydrides). The additional diol may or may not contain non-aromatic carbon-carbon unsaturation. The diacid may or may not contain non-aromatic carbon-carbon unsaturation, and mixtures of each type or of both types can be used.

At least some of the sites of non-aromatic carbon-carbon unsaturation on the starting polyester are then brominated to produce flame retardant additives of type ii).

An alternative method for making flame retardant additive type ii) is to first brominate the unsaturated starting material or materials, and then use the brominated material as a raw material for preparing the polyester.

Flame retardant additive type iii) is an allyl ester of a ring-brominated novolac resin. By "novolac" resin, it is meant a polymer of formaldehyde and a phenolic compound. At least a portion of the phenolic rings in the novolac resin are bromine-substituted, preferably in the ortho-position. The phenolic compound optionally may contain 1 or 2 substituent groups on the ring (other than bromine). Preferably, the phenolic compound contains no such substituent, or one substituent group, especially lower alkyl such as methyl, in the para-position. Flame retardant additives of type iii) include those represented by the idealized structure:

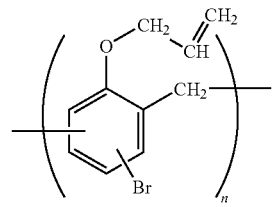

In the foregoing structure, the Br atom is preferably in the ortho position (relative to the allyl ether group) and n represents the degree of polymerization.

Flame retardant additives of type iii) can be prepared from a novolac resin, many of which are commercially available. Bromine substitution is introduced readily onto the phenolic rings. Allyl ether groups can be introduced by reaction with sodium hydride to form alkoxide groups, which then react with an allyl halide such as allyl chloride or allyl bromide to produce the ether.

Flame retardant additive iv) is a 3-bromo-2-hydroxypropyl ether of a novolac resin. These are readily prepared by brominating a glycidyl ether of a novolac resin. Such resins are readily commercially available from The Dow Chemical Company under the tradename D.E.N.™ epoxy resin. The phenolic rings of the novolac resin can be substituted, particularly with one or more alkyl groups, especially methyl groups. The reaction of the epoxy groups of such resins with a bromine source produces the corresponding bromohydrin. Flame retardant additives of type iv) include those having the structure:

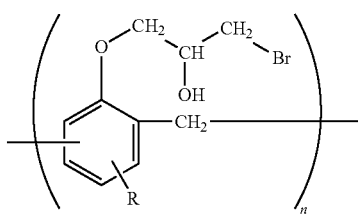

wherein R represents an optional substituent on the phenolic ring and n represents the degree of polymerization.

Flame retardant additive v) is a 2,3-dibromopropyl ether of a cresol novolac resin. It can be prepared from a cresol novolac starting resin, by sequentially reacting it with sodium hydride to form the corresponding phenoxide, then with allyl bromide to form the allyl ether, and then with a brominating agent. Flame retardant additives of type v) include those having the idealized structure:

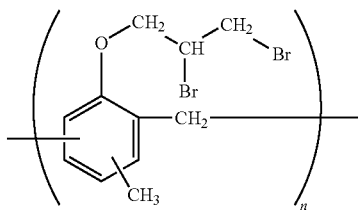

wherein n represents the degree of polymerization and the methyl substitution on the aromatic ring is preferably in the ortho or para position relative to the 2,3-dibromopropyl ether group.

Flame retardant additive vi) is a brominated polymer or copolymer that is formed in a ring-opening metathesis polymerization (ROMP) process from certain non-aromatic cyclic monomers that have carbon-carbon unsaturation in a ring structure. Examples of ROMP polymers that are useful as starting materials for making type vi) flame retardant additives include homopolymers and copolymers of cyclopentene, cyclooctene, norbornene, cyclohexenylnorbornene, exo-norbornene dicarboxylic anhydride and dicyclopentadiene. Examples of suitable comonomers include cyclic olefins such as cyclooctene. The ROMP polymers and copolymers contain carbon-carbon double bonds in the main polymer chain, which are easily brominated to form the flame retardant additive.

Various bromination methods can be used to brominate the various starting resins described above to produce the flame retardant additives. In some cases, the starting resin is conveniently brominated in a solvent using a source of elemental bromine as the brominating agent. The solvent is one which is not reactive with the polymer and which does not engage in free-radical reactions with the bromine source or bromine. Suitable solvents include, for example, carbon tetrachloride, dichloroethane, tetrahydrofuran, methylene chloride, methylene bromide, bromochloromethane ($CH_2BrCl$) and n-heptane. Suitable brominating conditions are well-known and described, for example, in McCutcheon, *Org. Synth.* Vol. 3, E. C. Horning, Ed., John Wiley and Sons, Inc. London 1955, pp. 526-528.

In another bromination approach, the starting resin is brominated using a quaternary ammonium tribromide as the brominating agent. Examples of suitable quaternary ammonium tribromides include phenyltrialkylammonium tribromide, a benzyltrialkylammonium tribromide or a tetraalkylammonium tribromide.

Starting resins containing epoxide groups can be brominated using lithium bromide or hydrogen bromide as a brominating agent.

Other techniques for brominating carbon-carbon unsaturation and epoxy groups as are known in the art are also useful.

The foregoing flame retardant additives of types i)-vi) may have a number average molecular weight of from about 500 to 250,000 or more, with a molecular weight of from about 1000 to 200,000, especially from 1500 to 100,000, being preferred. Molecular weight determinations for purposes of this invention are determined by gel permeation chromatography against polystyrene standards. The flame retardant additives preferably contain at least 10%, more preferably at least 20%, by weight bromine. The flame retardant additive may contain any greater amount of bromine, such as up to 80%, up to 70% or up to 55% by weight bromine For most applications, preferred flame retardant additives of types i)-vi) have a glass transition temperature ($T_g$) of at least 35° C., preferably at least 50° C. Flame retardant additives having a lower glass transition temperature can be used, but they tend to be liquids or tacky solids, and for that reason are in some instances more difficult to handle and to mix with the combustible polymer. The flame retardant additive should have a glass transition temperature of no greater than 200° C., preferably no greater than 150° C., in order to facilitate melt-processing.

Flame retardant additives of the invention that have a glass transition temperature below 20° C., or even below 0° C., are most useful in suspension polymerization processes, particularly if they are soluble in the monomer or monomer mixture being polymerized. These low glass transition temperature additives tend to be liquids or pasty solids. They can be incorporated into a suspension polymerization process to make expandable polymer beads that contain the flame retardant additive, which then can be used to make bead foam. Higher $T_g$ flame retardant additives that are soluble in the monomer or monomer mixture also can be used in suspension polymerization processes.

The flame retardant materials of types i)-vi) are useful as flame retardant additives for a variety of combustible polymers. "Combustible" here simply means that the polymer is capable of being burned. Combustible polymers of interest include polyolefins such as polyethylene (including copolymers of ethylene such as ethylene-α-olefin copolymers); polypropylene and the like; polycarbonates and blends of polycarbonates such as blends of a polycarbonate with a polyester, an acrylonitrile-styrene-butadiene resin or polystyrene; polyamides; polyesters; epoxy resins; polyurethanes; and polymers of vinyl aromatic monomers, as well as other flammable polymers in which the flame retardant additive can be dissolved or dispersed.

Polymers and copolymers of vinyl aromatic monomers are of particular interest as the combustible polymer. A "vinyl aromatic" monomer an aromatic compound having a polymerizable ethylenically unsaturated group bonded directly to a carbon atom of an aromatic ring. Vinyl aromatic monomers include unsubstituted materials such as styrene, divinylbenzene and vinyl naphthalene, as well as compounds that are substituted on the ethylenically unsaturated group (such as, for example alpha-methylstyrene), and/or are ring-substituted. Ring-substituted vinyl aromatic monomers include those having halogen, alkoxyl, nitro or unsubstituted or substituted alkyl groups bonded directly to a carbon atom of an aromatic ring. Examples of such ring-substituted vinyl aromatic monomers include 2- or 4-bromostyrene, 2- or 4-chlorostyrene, 2- or 4-methoxystyrene, 2- or 4-nitrostyrene, 2- or 4-methylstyrene and 2,4-dimethylstyrene. Preferred vinyl aromatic monomers are styrene, alpha-methyl styrene, 4-methyl styrene, divinylbenzene and mixtures thereof.

Especially preferred combustible polymers are polystyrene, styrene-acrylonitrile copolymers, styrene-acrylic acid copolymers and styrene-acrylonitrile-butadiene (ABS) resins. Polystyrene is an especially preferred combustible polymer.

Another combustible polymer of interest is a random, block or graft copolymer of butadiene and at least one vinyl aromatic monomer.

Expanded polymers of any of these types are of interest. An expanded combustible polymer suitably has a foam density of from about 1 to about 30 pounds per cubic foot (pcf) (16-480 kg/m$^3$), especially from about 1.2 to about 10 pcf (19.2 to 160 kg/m$^3$) and most preferably from about 1.2 to about 4 pcf (19.2 to 64 kg/m$^3$).

Flame retardant additives of any of types i) to vi) above having a 5% weight loss temperature of at least 180° C., preferably at least 200° C., as determined by the foregoing test, are preferred in making extruded foams, as their relatively good thermal stability allows them to be processed in the foam extrusion process by which the foam is made. 5% weight loss temperature is measured by thermogravimetric analysis as follows: ~10 milligrams of the flame retardant additive is analyzed using a TA Instruments model Hi-Res TGA 2950 or equivalent device, under a flow of gaseous nitrogen and a heating rate of 10° C./min over a range of from room temperature (nominally 25° C.) to 600° C. The mass lost by the sample is monitored during the heating step, and the temperature at which the sample has lost 5% of its initial weight is designated the 5% weight loss temperature (5% WLT). This method provides a temperature at which a sample has undergone a cumulative weight loss of 5 wt %, based on initial sample weight. When used in conjunction with a combustible polymer that is to be melt-processed (either to blend it with the combustible polymer or to process the blend into an article such as a foam, extruded part, molded part, or the like), the flame retardant additive preferably exhibits a 5% WLT at least as high as the maximum temperature that the flame retardant additive will experience during the melt-processing operation.

Enough of a flame retardant additive of any of types i)-vi) above is incorporated into the combustible polymer to improve the performance of the combustible polymer in one or more standard fire tests. A suitable amount is typically at least one weight percent, or at least 2 weight percent or at least 3 weight percent, based on the weight of the polymer and the flame retardant additive. The amount of the flame retardant additive may be as much as 25 weight percent, or as much as 15 weight percent, or as much as 10 weight percent.

The amount of flame retardant that is used can alternatively (or in addition) be expressed in terms of the bromine content of the combustible polymer/flame retardant additive mixture. This bromine content in such a mixture is suitably at least 0.5 weight percent, more suitably at least 1.0 weight percent and even more suitably at least 1.5 weight percent, up to 20 weight percent, more suitably up to 10 weight percent and even more suitably up to 5 weight percent.

Any one or more of several tests can be used to indicate an improvement in FR performance. Suitable standardized tests include a limiting oxygen index (LOI) measurement, in accordance with ASTM D2863; and various time-to-extinguish tests or flame spread tests such as that known as FP-7 (described further below) and the DIN 4102 part 1, NF-P 92/501/4/5, SIA 183 or EN ISO 11925-2 tests which are used in Germany, France, Switzerland and Europe, respectively.

Improvement is established in the LOI method if the limiting oxygen index of the extruded polymer foam is increased by at least 0.5 unit, preferably by at least 1.0 unit and more preferably at least 2 units, compared to an otherwise like foam which does not contain an FR additive. FR performance in the LOI test may be increased by as much as 8 units or more. An extruded styrene polymer or copolymer foam containing a flame retardant additive of the invention may exhibit an LOI of at least 21%, preferably at least 22% and more preferably at least 24%.

Another fire test is a time-to-extinguish measurement, known as FP-7, which is determined according to the method described by A. R. Ingram in *J. Appl. Poly. Sci.* 1964, 8, 2485-2495. This test measures the time required for flames to become extinguished when a polymer sample is exposed to an igniting flame under specified conditions and the ignition source is then removed. An improvement in performance in this test is indicated by a shorter time being required for the flames to become extinguished. The time required for extinguishment under this test, when the polymer sample contains a flame retardant additive of any of types i)-vi), is preferably reduced by at least one second, more preferably by at least 3 seconds and even more preferably by at least 5 seconds, compared to when the polymer sample does not contain an FR additive. A time to extinguishment on the FP-7 test is desirably less than 15 seconds, preferably less than 10 seconds and more preferably less than 5 seconds.

Improvement is indicated in other time-to-extinguishment or flame spread tests such as DIN 4102 part 1, NF-P 92/501/4/5, SIA 183 and EN ISO 11925-2 tests by a "pass" rating, or alternatively by a reduction in the flame height, flame extinction time and/or formation of burning droplets, as specified in the individual test methods, compared to a similar polymer sample that does not contain an FR additive.

Non-cellular polymers may perform differently than foamed polymers in these various tests. Similarly, particular flame retardant additives may provide a greater benefit in a non-cellular polymer system than in a cellular polymer, or vice-versa. Cellular polymers often present a more challenging problem than do non-cellular polymers, in part because of the higher surface area of the cellular polymers.

Polymer blends in accordance with the invention may include other additives such as other flame retardant additives, flame retardant adjuvants, thermal stabilizers, ultraviolet light stabilizers, nucleating agents, antioxidants, foaming agents, acid scavengers and coloring agents.

Polymer blends containing a flame retardant additive in accordance with the invention may be melt or solution processed to form a wide variety of products. Expanded (cellular) products are of interest because of their use in various building and automotive applications, in which fire performance is a concern. Expanded polymer products may have a bulk density of 10 pcf or less, more typically from 1.5 to 5 pcf and especially from 1.5 to 3 pcf. Expanded polymers of vinyl aromatic polymers, butadiene polymers and copolymers of vinyl aromatic polymers and/or butadiene polymers, as described before, are of particular interest. The expanded polymers may be used, for example, as insulating and/or cushioning materials in construction, household, automotive and other applications. Expanded polymers of the invention can also be used as an attached cushion or underlayment for carpeting. Non-cellular polymers can also be made in accordance with the invention.

The following examples are provided to illustrate the invention, but not to limit the scope thereof. All parts and percentages are by weight unless otherwise indicated.

EXAMPLE 1

In a 250 ml 3-neck flask (under a nitrogen atmosphere), allyl amine (9.5 g, 0.15 mole) is dissolved in 50 mL dimethyl formamide (DMF). A solution of a styrene-maleic anhydride copolymer (30.0 g, 0.148 mole anhydride, $M_w$ is 5300, $M_n$ is 1900) in 50 mL DMF is added to the stirred solution over 20 minutes. Some precipitate forms during the addition, but this re-dissolves with time and heat. The resulting mixture is further heated for 7 hours in a bath heated to 140° C. After cooling, the allyl imide of the styrene-maleic anhydride copolymer is isolated by precipitation in 500 mL isopropanol, filtering the polymer and drying it overnight in a vacuum oven at 60° C.

The allyl imide intermediate (10.0 g, 0.0415 mole double bonds) and LiBr (3.6 g, 0.0415 mole) are dissolved in 75 mL tetrahydrofuran (THF) in a 250 ml 3-neck flask under a nitrogen atmosphere. With stirring, pyridinium tribromide (13.3 g, 0.0415 mole) is added. The mixture is stirred at room temperature for 24 hours, and the solids are then filtered off. The resulting polymer solution is diluted with 60 mL THF and washed with 50 mL water that contains 1 g sodium bisulfite. The product 2,3-dibromopropyl imide of the styrene/maleic anhydride copolymer is isolated by precipitation in 1 liter isopropanol, filtering, and drying the precipitated solids overnight in a vacuum oven at 60° C. Yield is 12.8 g. $M_w$ is 7900, $M_n$ is 5000. The product contains 36.6 wt % bromine and 1010 ppm residual free bromide. The $T_g$ of the product is 147° C., and its 5% WLT is 268° C.

A portion of the sample is melt blended with a polystyrene resin at a ratio that provides 2.0 weight % of bromine in the blend. The solidified melt blends are ground using a Wiley lab grinder and a 3 millimeter (mm) screen size. 25-27 g aliquots of the ground melt blends are compression molded into plaques measuring 100 mm×100 mm×1.5 mm using a Pasadena Hydraulic Platen Press (Model # BL444-C-6M2-DX2357) operating at a set point temperature of 180° C. with a pressure application time of 5 min and an applied pressure of 25,000 pounds per square inch (psi) (172 MPa). The molded plaques are cut into strips for Limiting Oxygen Index (LOI) and FP-7 testing. LOI is evaluated according to ASTM D 2863, and is found to be 23.3%. FP-7 is evaluated as described *J. Appl. Poly. Sci.* 1964, 8, 2485-2495 and found to be 2.4 s.

EXAMPLE 2

A solution of terephthaloyl chloride (10.0 g, 0.049 mole) and anhydrous pyridine (9.5 g, 0.12 mole) in 70 mL methylene chloride is stirred under a nitrogen atmosphere. A solution of 2,3-dibromo-1,4-butanediol (11.5 g, 0.047 mole) in 80 mL methylene chloride is added dropwise. 20 mL of THF is added to completely dissolve the diol. After stirring 2.5 hours at room temperature, 2 mL of methanol is added. The resulting solution is washed with 100 mL of 1 N HCl solution, then precipitated in 1 liter of methanol. The precipitated product is dried overnight in a vacuum oven at 60° C. Yield is 14.4 g, $M_w$ is 2950 and $M_n$ is 1600. The $T_g$ of the product is 72° C. and its 5% WLT is 298° C. The product has the following idealized structure:

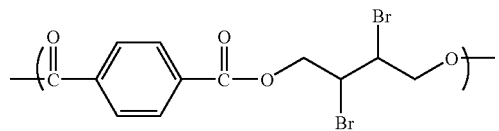

A blend of the product in polystyrene (bromine content in the blend=2.0 wt %) made and tested as described in Example 1 has an LOI of 22.5. The time to extinguishment in the FP-7 test is 2.3 s.

EXAMPLE 3

An unsaturated copolyester of cyclohexanedimethanol, isophthalic acid and dimethyl maleate, (isophthalate/maleate mole ratio of 52/48, about 23% of the maleate has isomerized to fumarate) (18.0 g, estimated 0.0325 mole double bonds) is dissolved in 75 mL methylene chloride. A solution of bromine (5.2 g, 0.0325 mole) in 10 mL methylene chloride is added to this solution. After 7 days at room temperature, the reaction mixture is washed with 50 mL water that contains 0.5 g sodium bisulfite, and the product is recovered by precipitation in 500 mL methanol. After drying overnight in a vacuum oven at 50° C., 13.7 g of the brominated polymer is obtained. The $M_w$ of the brominated polymer is 4150 and its $M_n$ is 2300. The $T_g$ of the brominated polymer is 44° C. and its 5% WLT is 247° C. The product contains 19.2% bromine and 117 ppm residual free bromide. It has the following idealized structure:

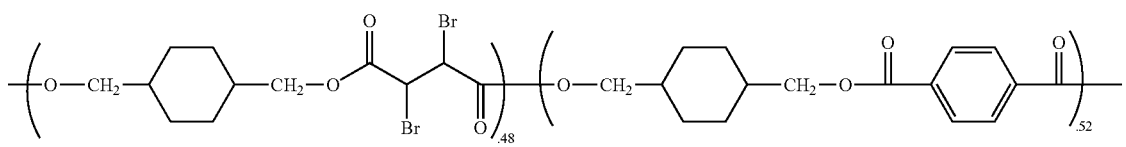

wherein 0.48 and 0.52 represent the mole fractions of the respective repeating units.

A blend of the product in polystyrene (bromine content in the blend=2.0 wt %) made and tested as described in Example 1 has an LOI of 28.0. The time to extinguishment in the FP-7 test is 0.8 s.

EXAMPLE 4

Polycyclohexanedimethanol maleate (4.7 g, 0.0208 moles unsaturation) is dissolved in 20 mL methylene chloride, and a solution of bromine (3.33 g, 0.0208 mole) in 5 mL methylene chloride is added. After 7 days at room temperature, 10 mL methylene chloride is added and the solution is washed with 20 mL water that contains 0.5 g sodium bisulfite. The brominated product is recovered by precipitation in 200 mL methanol, and then dried overnight in a 70° C. vacuum oven. The $M_w$ of the product is 11600, and its $M_n$ is 6000. The product has a 5% WLT of 248° C. The brominated product contains approximately 40% by weight bromine and has the following idealized structure:

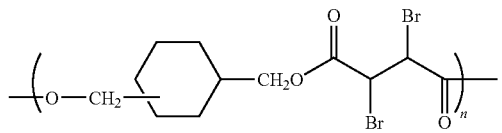

A blend of the product in polystyrene (bromine content in the blend=2.0 wt %) made and tested as described in Example 1 has an LOI of 24.5. The time to extinguishment in the FP-7 test is 0.5 s.

EXAMPLE 5

A phenol novolac resin (20.0 g, 0.189 mole) is dissolved in 30 mL chloroform and 10 mL methanol and to it is slowly added a solution of bromine (30.2 g, 0.189 mole) in 10 mL chloroform. The resulting solution is washed with two 50 mL portions of water, and the product is isolated by concentrating then drying overnight in a vacuum oven at 60° C. Yield is 32 g of a ring-brominated phenol novolac resin.

The brominated phenol novolac resin (15.2 g) is dissolved in 70 mL DMF. NaH (2.35 g, 0.098 mol) is added slowly. Allyl bromide (14.9 g, 0.123 mol) is then added over 45 minutes and the mixture stirred for four hours at room temperature. The mixture is then filtered, 70 mL toluene is added and the polymer solution is washed with 70 mL water containing 1 ml of 1 N HCl. The toluene layer is concentrated, and the product is dried overnight in a vacuum oven at 60° C. Yield is 17.6 g of a brown viscous oil. The 5% WLT of the product is 232° C. $M_w$ and $M_n$ for the product are is 880 and 480, respectively and its $T_g$ is –27° C.

The product has the following idealized structure:

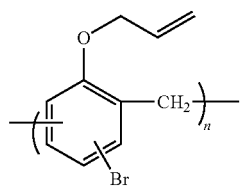

wherein n represents the degree of polymerization.

EXAMPLE 6

An epoxy o-cresol novolac resin (10.0 g, 0.057 mole) is dissolved in 100 mL THF. Acetic acid (10.3 g, 0.17 mol) is added, followed by LiBr (7.9 g, 0.091 mol). After 24 hours of stirring at room temperature, the mixture is filtered, 100 mL methylene chloride is added and the solution is washed with 100 mL water and 100 mL of water containing 5 g sodium bicarbonate. The product is recovered by precipitation in 1 liter hexane and dried overnight in a vacuum oven at 70° C. Yield is 9 g. The $M_w$ and $M_n$ of the 2,3-dibromopropyl ether are 3440 and 1980, respectively. Its 5% WLT is 267° C. and its $T_g$ is 52° C. The product contains 26.7% bromine and 191 ppm residual free bromide. The idealized structure of the product is as follows:

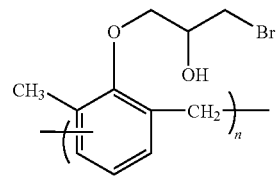

wherein n represents the degree of polymerization.

A blend of the product in polystyrene (bromine content in the blend=2.0 wt %) made and tested as described in Example 1 has an LOI of 25.0. The time to extinguishment in the FP-7 test is 1.2 s.

EXAMPLE 7

An epoxy novolac resin (3.0 g, 0.0185 mole assuming a repeat unit formula weight of 162) and acetic acid (3.4 g, 0.056 mole) are dissolved in 50 mL THF. The mixture is stirred under nitrogen atmosphere and LiBr (2.6 g, 0.030 mole) is added. After 21 hours at room temperature, 50 mL methylene chloride is added, and the solution is washed with 100 mL water. The brominated product is recovered by precipitation in 600 mL hexane. The product is dried overnight in a vacuum oven at 70° C., and 1 g of a soft, tacky solid is recovered. The 5% WLT of the brominated product is 256° C. It has the following idealized structure:

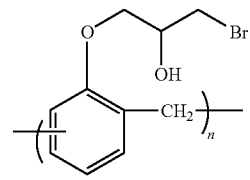

EXAMPLE 8

An o-cresol novolac resin (9.8 g, 0.082 mol) and DMF (70 mL) are added under nitrogen to a 250 ml 3-neck flask. NaH (2.55 g, 0.106 mol) is slowly added to the stirred solution. Allyl bromide (14.9 g, 0.123 mol) is then added drop-wise over 30 minutes. The reaction is continued for 19 hours at room temperature. The solids are filtered off and 70 mL toluene is added. The resulting solution is washed with 70 mL of water. The product allyl ether of the o-cresol novolac resin is isolated by evaporating off toluene, then drying overnight in vacuum oven at 60° C.

The o-cresol novolac allyl ether (5.95 g, 0.037 mol double bond) is dissolved in dichloroethane (DCE, 30 mL). Tetraethylammonium bromide (TEAB, 9.75 g, 0.046 mol) and DCE (25 ml) and then bromine (5.9 g, 0.037 mol) are added to a separate bottle. The resulting tetraethylammonium tribromide (TEATB) solution is then added slowly to the o-cresol novolac allyl ether solution. After 6 hours reaction at room temperature, solids are filtered off and rinsed with 20 mL DCE. The resulting polymer solution is washed with 25 mL water containing 0.5 g sodium bisulfite, then 25 mL water containing 0.1 g sodium bicarbonate. The resulting brominated polymer is isolated by evaporation of DCE, then dried overnight at 60° C. in a vacuum oven. Yield is 9 g. The brominated polymer has a 5% WLT of 274° C. and a $T_g$ of 37° C. The brominated polymer contains 50.1% bromine and 380 ppm residual free bromide. It has the following idealized structure:

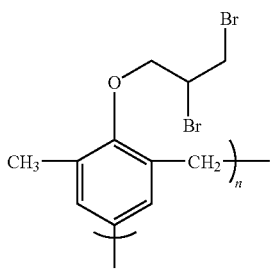

A blend of the brominated polymer in polystyrene (bromine content in the blend=2.0 wt %) made and tested as described in Example 1 has an LOI of 23.7. The time to extinguishment in the FP-7 test is 1.9 s.

EXAMPLE 9

Polycyclooctene (1.72 g, 0.0156 mol double bonds, prepared in a ring opening metathesis polymerization) ($M_w$ 81,000, $M_n$ 36,500) is dissolved in a mixture of 1,2-dichloroethane (DCE, 15 mL) and methylene chloride (15 mL). In a separate container are added tetraethylammonium bromide (4.13 g, 0.01965 mol) and dichloroethane (7 mL), followed by bromine (2.50 g, 0.0156 mol). The resulting tetraethylammonium tribromide solution is added slowly to the polycyclooctene solution. The resulting mixture is shaken for 16 hours at room temperature, and then solids are filtered off and rinsed with 15 mL methylene chloride. The resulting brominated polymer solution is washed with 30 mL water containing 0.3 g sodium bisulfite. The brominated polymer is isolated by precipitation in 300 mL methanol, and then dried overnight at 70° C. in a vacuum oven. The product is a rubbery solid having a 5% WLT of 244° C., an $M_w$ of 108,000, and $M_n$ of 58,800 and a $T_g$ of −15° C. The product contains 58.2% bromine and 385 ppm residual free bromide.

A blend of the product in polystyrene (bromine content in the blend=2.0 wt %) made and tested as described in Example 1 has an LOI of 23.8. The time to extinguishment in the FP-7 test is 0.2 s.

EXAMPLE 10

Poly(dicyclopentadiene) (2.0 g, 0.030 moles) is dissolved in 30 mL THF. A solution of pyridinium tribromide (PTB, 9.6 g, 0.060 mole) in 20 mL THF is added to the polymer solution. After 2 days at room temperature, the solution has turned black. The mixture is filtered, and the polymer solution is washed with 50 mL water that contains 1 g sodium bisulfite. The brominated product is then recovered by precipitation in 300 mL methanol. The resulting product is purple in color and has a 5% WLT of 170° C. It has the following idealized structure:

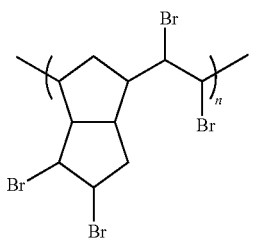

What is claimed is:

1. A polymer composition comprising a combustible polymer having mixed therein a brominated FR additive selected from one or more of the following:
    i) a copolymer having styrene and 2,3-dibromopropylmaleimide repeating units;
    ii) a brominated polyester having aliphatically bound bromine;
    iii) an allyl ether of a ring-brominated novolac resin;
    iv) a 3-bromo-2-hydroxypropyl ether of a novolac resin;
    v) a 2,3-dibromopropyl ether of a cresol novolac resin; and
    vi) a brominated ROMP polymer or copolymer.

2. The polymer composition of claim 1, wherein the combustible polymer is a polymer or copolymer of a vinyl aromatic monomer.

3. The polymer composition of claim 2, wherein the combustible polymer is a polymer or copolymer of styrene, alpha-methyl styrene, 4-methyl styrene, divinylbenzene or a mixture of any two or more thereof.

4. The polymer composition of claim 2, wherein the combustible polymer is polystyrene, a styrene-acrylonitrile copolymer, a styrene-acrylic acid copolymer or a styrene-acrylonitrile-butadiene resins.

5. The polymer composition of claim 2, wherein the combustible polymer is polystyrene.

6. The polymer composition of claim 2, wherein the combustible polymer is a random, block or graft copolymer of butadiene and at least one vinyl aromatic monomer.

7. The polymer composition of claim 1, which is a foam.

8. A polymer composition comprising a combustible polymer having mixed therein a brominated FR additive selected from one or more of the following:
    ii) a brominated polyester having aliphatically bound bromine;
    iii) an allyl ether of a ring-brominated novolac resin;
    iv) a 3-bromo-2-hydroxypropyl ether of a novolac resin;
    v) a 2,3-dibromopropyl ether of a cresol novolac resin; and
    vi) a brominated ROMP polymer or copolymer.

9. The polymer composition of claim 8, wherein the combustible polymer is a polymer or copolymer of a vinyl aromatic monomer.

10. The polymer composition of claim 9, wherein the combustible polymer is a polymer or copolymer of styrene, alpha-methyl styrene, 4-methyl styrene, divinylbenzene or a mixture of any two or more thereof.

11. The polymer composition of claim 9, wherein the combustible polymer is polystyrene, a styrene-acrylonitrile copolymer, a styrene-acrylic acid copolymer or a styrene-acrylonitrile-butadiene resins.

12. The polymer composition of claim 9, wherein the combustible polymer is polystyrene.

13. The polymer composition of claim 9, wherein the combustible polymer is a random, block or graft copolymer of butadiene and at least one vinyl aromatic monomer.

14. The polymer composition of claim 8, which is a foam.

* * * * *